J. S. LUPTON.
PLOW.
APPLICATION FILED JULY 22, 1909.
1,017,105.
Patented Feb. 13, 1912.
2 SHEETS—SHEET 1.
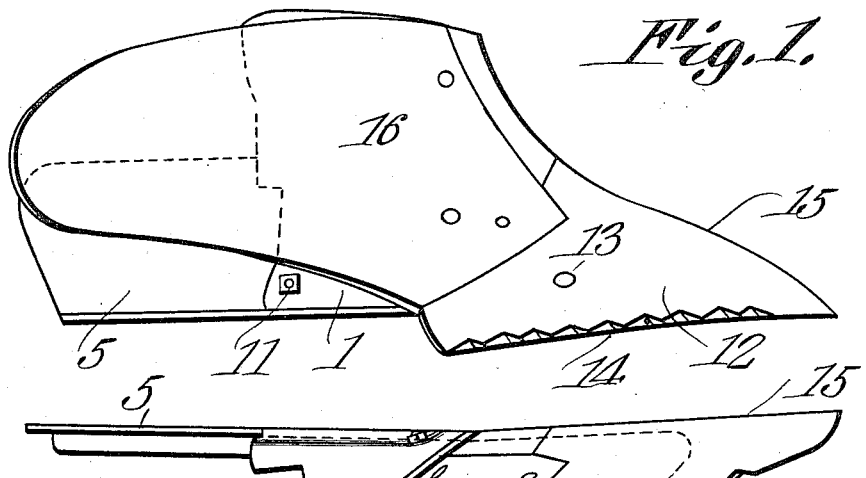
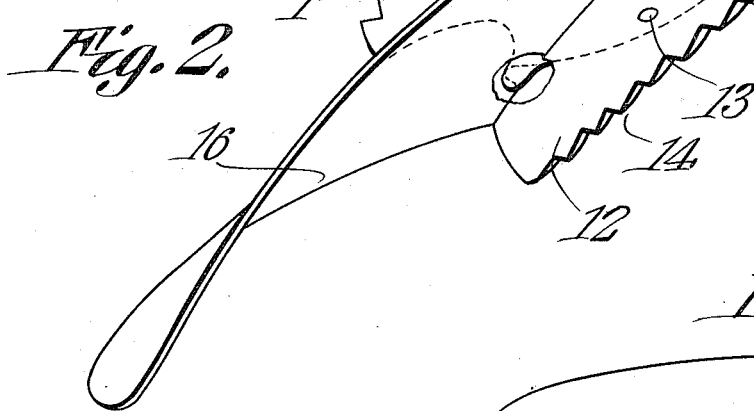
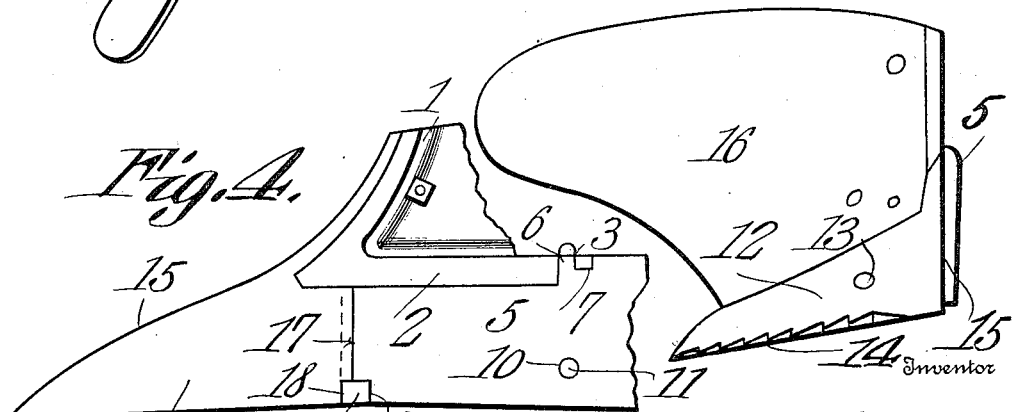
James S. Lupton.

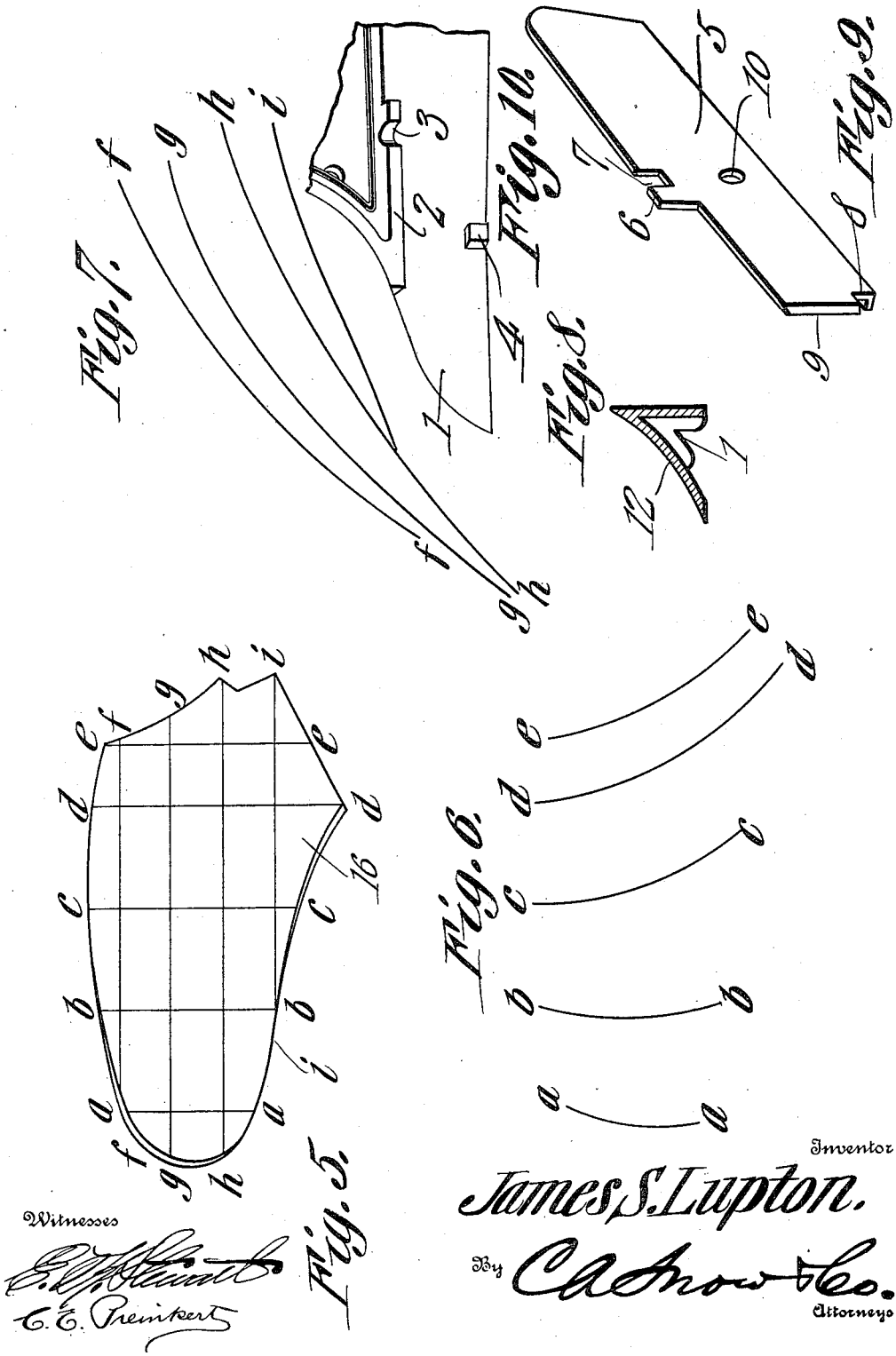

UNITED STATES PATENT OFFICE.

JAMES SCHUYLER LUPTON, OF CHATTANOOGA, TENNESSEE.

PLOW.

1,017,105.

Specification of Letters Patent.   Patented Feb. 13, 1912.

Application filed July 22, 1909. Serial No. 508,990.

*To all whom it may concern:*

Be it known that I, JAMES S. LUPTON, a citizen of the United States, residing at Chattanooga, in the county of Hamilton and State of Tennessee, have invented a new and useful Plow, of which the following is a specification.

This invention has relation to plows, and it consists in the novel construction and arrangement of its parts, as hereinafter shown and described.

The object of the invention is to provide, in a plow structure, a land-side plate, which is securely and rigidly held upon the frog of the plow by means of lugs and recesses provided upon the frog and land-side. The said lugs and recesses are so disposed that the effect of the strain upon the plow structure caused by the suction of the point of the share, is transmitted directly from the land-side plate to the frog without subjecting the bolt which passes transversely through the frog and the land-side plate to such strain.

A further object of the invention is to provide a joint between the land-side plate and the point of the share which is adapted to brace the land-side plate and hold the same in position against side pressure.

A further object of the invention is to provide a share of peculiar configuration, in which the point is provided with a convexed cutting edge, which serves as a colter to cut the furrow from the land-side instead of tearing it, as is usually the case. By such a structure the friction is materially reduced, and there is nothing to retard the travel of the soil along the mold-board of the plow. The lower mold-board side of the share may be provided with a cutting edge, if desired, and, by such an arrangement, an effective and durable structure is produced.

In the accompanying drawings: Figure 1 is a side elevation of the plow looking at the mold-board thereof. Fig. 2 is a top plan view of the plow. Fig. 3 is a front elevation of the plow. Fig. 4 is a side elevation, looking at the land-side of the plow. Fig. 5 is a plan view of the mold-board of the plow with isometric lines thereon. Figs. 6 and 7 are sectional views through the mold-board cut on the lines indicated in Fig. 5. Fig. 8 is a transverse sectional view of the share. Fig. 9 is a perspective view of the land-side plate, detached. Fig. 10 is a perspective view of a portion of the plow frog.

The frog 1 of the plow is provided upon its land-side with an approximately horizontal rib 2, having near its rear end a recess 3. The said frog 1 is provided at the lower edge of its land-side with an outstanding lug 4. A land-side plate 5 is adapted to fit against the land-side portion of the frog 1, and the upper edge of the said plate 5 bears against the lower edge of the rib 2. The land-side plate 5 is provided at its upper edge with a lug 6, adapted to enter the recess 3 in the rib 2, and the upper portion of the said land-side plate 5 is provided with a recess 7, adapted to receive the rear portion of the said rib 2. The land-side plate 5 is also provided at the lower portion of its forward edge with a recess 8, adapted to receive the lug 4 carried by the frog 1. The forward edge of the land-side plate 5 is chamfered as at 9, and the said plate is provided with a bolt perforation 10 adapted to receive a bolt 11, which also passes transversely through the land-side portion of the frog 1.

A share 12 is mounted upon the lower portion of the frog 1 and is located in advance of the land-side plate 5 in the usual manner. The share 12 is held in position upon the frog by means of a bolt 13, which passes transversely through the mold-board portion of the share and the frog. If desired, the bottom cutting edge of the share 12 may be sharpened and serrated as at 14. The point of the share 12 is provided with a sharp convex edge 15, and the surface of the land-side portion of the share 12 at an angle to the plane of the surface of the land side plate 5. The lower edges of the land side portion of the share 12 and the plate 5 are in anticlinal relation as shown in Fig. 4 of the drawings. The soil-engaging surface of the mold-board 16 has the peculiar configuration as indicated by Figs. 6 and 7 of the drawings, and, inasmuch as the said mold-board is attached to the frog 1 above the share 12. By reference to the said lines in which the soil-engaging surface of the mold-board lies, it will be seen that the said surface of the said board has an approximate spiral configuration, and, consequently, as the soil travels up upon the said board, it is turned over, and is deposited in the adjacent furrow in completely inverted posture. Also, as the plow cuts through the sod, the edge 15 upon the point of the share 12 serves as a colter and produces a clean incision at the land side of the furrow. Should the share 12 be provided with the serrations 14 as described, it is enabled to effectually cut tough soil and also sever such roots as it may come in contact with. By this assemblage of the parts of the plow it will be observed that the land-side plate 5 is braced in its position upon the frog 1 against the pressure of the ground against the under portion of the heel of the said plate, due to the suction upon the share while the plow is cutting the soil. Also the said land side plate 5 is held in position against strains longitudinally of its length by reason of the lug 6 entering the recess 3 provided in the rib 2, and thus the bolt 11 is relieved of unnecessary strain. The rear edge of the land side portion of the share 12 is chamfered as at 17, and the chamfered end 9 of the land side plate 5 fits under the said chamfered end 17 of the said share, and the share is provided with a recess 18 adapted to receive the forward portion of the lug 4, mounted upon the frog 1.

The term "concave" as used herein is not to be understood in a mathematical sense as denoting the surface which is strictly concaved throughout, but signifies a surface which is concaved in effect, as for example where the concave is produced by plane surfaces angularly disposed.

What is claimed is:—

A plow comprising a frog having a rib upon its land side portion, said rib having a recess, said frog having at the lower edge of its land side portion a lug, a land side plate fitting upon the land side portion of the frog below the rib and having a lug adapted to enter the recess in the rib, and having a recess for the reception of the rear portion of the rib whereby the land side is locked against longitudinal movement, said land side plate having at its lower forward edge a recess for the reception of the lug upon the frog, a share fitting upon the frog in advance of the land side plate and having a recess for the reception of the forward portion of the lug upon the frog, said share and land side plate having chamfered overlapping ends.

In testimony that I claim the foregoing as my own, I have hereto affixed my signature in the presence of two witnesses.

JAMES SCHUYLER LUPTON.

Witnesses:
  THOS. NORTON,
  O. C. WRIGHT.

---

Copies of this patent may be obtained for five cents each, by addressing the "Commissioner of Patents, Washington, D. C."